United States Patent
Cavalucci et al.

[15] 3,673,706
[45] July 4, 1972

[54] DEMONSTRATION COMPASS

[72] Inventors: Ralph Cavalucci; John Walters, both of Cambridge, Mass.

[73] Assignee: American Science & Engineering, Cambridge, Mass.

[22] Filed: June 8, 1970

[21] Appl. No.: 44,359

[52] U.S. Cl. .............................................................35/19 A
[51] Int. Cl. ......................................................G09b 23/18
[58] Field of Search................35/19 R, 19 A; 33/222 A, 223, 33/225, 224

[56] References Cited

UNITED STATES PATENTS

| 1,973,716 | 9/1934 | Karnes | 33/222.5 |
| 1,645,699 | 10/1927 | Gulborg | 33/222.5 |

Primary Examiner—Robert W. Michell
Attorney—Charles Hieken

[57] ABSTRACT

An educational or demonstration compass for classroom and teaching use. The compass is formed of molded plastic and includes a separable base and pointer. The base includes an integral compass card. The pointer is supported at its mid portion above the base by a needle pivot bearing which is secured to the center of the base. Bar magnets are embedded removably within sockets formed in the pointer, the bar magnets being color coded or otherwise identified to permit visual identification of their north-seeking poles. The north indication on the compass card is supplemented by an enlarged projection. A similar, but smaller, projection is formed at the north-seeking end of the pointer to permit the student to correlate these ends readily.

12 Claims, 2 Drawing Figures

PATENTED JUL 4 1972 3,673,706

INVENTORS
RALPH CAVALUCCI
JOHN WALTERS
BY
Charles Hieken
ATTORNEYS

3,673,706

DEMONSTRATION COMPASS

BACKGROUND OF THE INVENTION

This invention relates to compasses, and more particularly, to a simple compass which is adapted for educational purposes and demonstrative use in which the individual, essential elements of the compass are indicated clearly and in an interrelated manner. When teaching fundamental compass theory, the essentials ordinarily are taught in concept as from a book. Actual compasses may be employed in conjunction with the theoretical material in order to demonstrate their theory and operation. These compasses, however, are designed primarily for functional and not educational use. For example, they often may not be disassembled readily to enable the students to inspect their various elements. Additionally, functional, commercial compasses are designed for use by those skilled in its theory and, therefore, do not include any special markings and or other features which would be helpful particularly to a student in correlating the various functions of the essential parts of the compass. The theoretical concepts of the compass operation may be rendered more difficult for a student when demonstrated with a commercial compass. One of the primary objects of this invention is to provide a compass which is suited particularly for use in a classroom for teaching basic compass theory to students.

SUMMARY OF THE INVENTION

The preferred embodiment of the invention includes two basic parts, the compass base and the compass pointer, both of which preferably are formed from a moldable plastic. The base includes an integrally molded compass card showing the four primary points of the compass. The north indication also includes a supplemental indicator such as a conical projection which accentuates the importance of the north pole. Formed integrally and centrally in the base is an upstanding support which has, at its upper end, an upwardly projecting needle bearing on which the compass arm is placed for low-friction support. The mid-portion of the compass arm includes a hub having a central inverted metallic cup which rests on the needle of the base to support the arm and permit the compass arm to rotate freely and with minimal friction. The arm may be lifted simply off the base to permit inspection of the low friction bearing which is characteristic of a compass.

The compass arm includes integral sockets which receive bar magnets disposed in alignment along the length of the compass arm. The magnets are coded, as by colors, to indicate clearly the north-seeking end of the bar magnets. The magnets may be removed to permit the student to inspect and experiment with them.

Among the primary objects of the invention is to provide a compass which is adapted particularly for use in a classroom to demonstrate compass theory.

A further object of the invention is to provide a compass in which the various essential elements thereof may be disassembled simply to permit inspection of each of the elements individually.

A further object of the invention is to provide a demonstration compass in which the various portions of the compass are coded, as by colors, with respect to each other to facilitate demonstration of the interelation of the various elements of the compass.

Another object of the invention is to provide a compass suited for classroom use which is of simple, inexpensive construction yet which displays sufficient accuracy to demonstrate readily compass theory.

A feature of the invention is that it stabilizes pointing to Magnetic North within 1 minute.

DESCRIPTION OF THE DRAWINGS

The foregoing and other objects and advantages of the invention will be understood more fully with reference to the following detailed description thereof, with reference to the accompanying drawings wherein.

DESCRIPTION OF THE PREFERRED EMBODIMENTS

Figure 1:
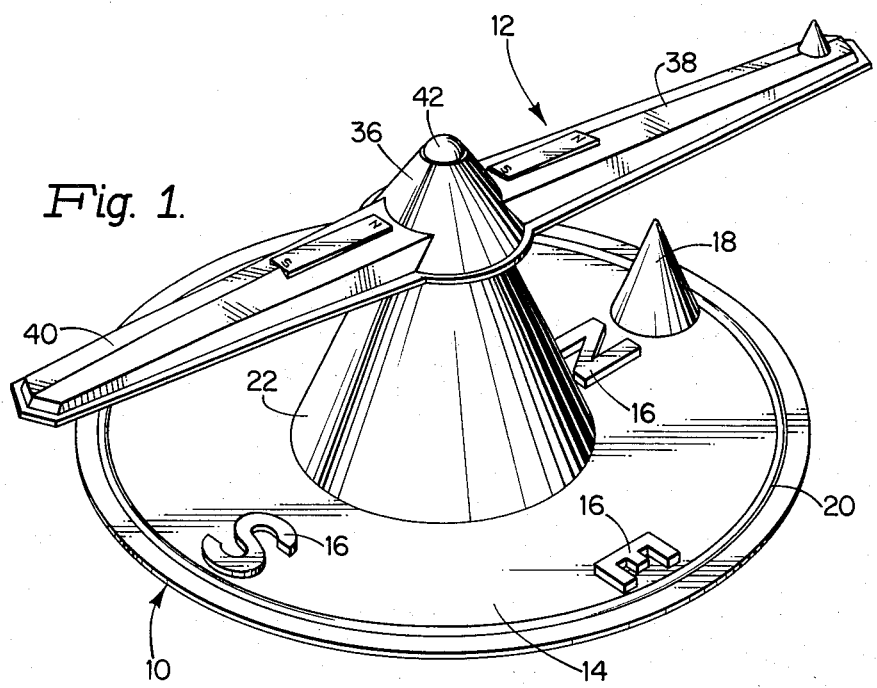
FIG. 1 is an isometric view of the compass.
Figure 2:
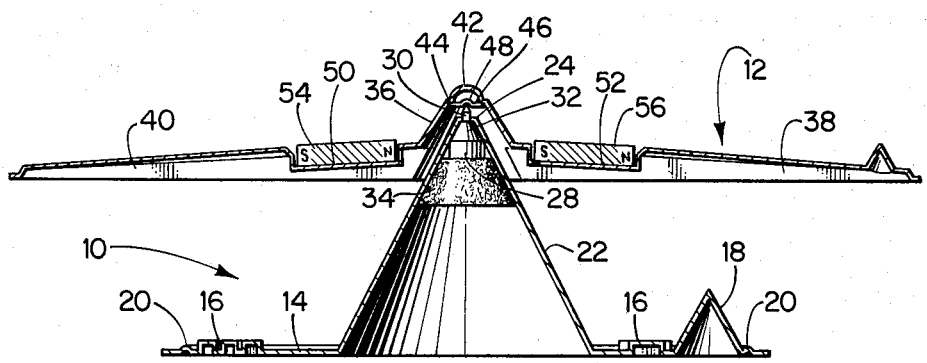
FIG. 2 is an elevation, in section of the compass.

As shown in the drawings the compass includes a base and compass arm, indicated generally by the reference characters 10, 12 respectively. Both the base 10 and compass arm 12 preferably are formed from a moldable plastic material such as high-impact styrene. The base 10 includes a substantially flat margin 14 in which is molded raised indicia 16 to define the four basic points of the compass. Additionally, the north point of the compass may also be marked by a raised projection such as the cone 18 in order to emphasize the importance of the north point of the compass. A raised bead 20 also may be formed circumferentially about the flat margin 14 to include the embossed compass points and for decoration.

The base 10 also includes an upstanding central stand 22 which is molded integrally therewith and, in the illustrative embodiment, is in the form of a cone. The upper end of the conical stand 22 includes a flattened portion 24 having a hole formed therein. A fulcrum insert 28 having an integral upstanding needle bearing 30 is cemented within the upper internal end of the conical stand 22 with the needle bearing 30 protruding upwardly through the hole 26 in the flattened portion 24 of the cone. The fulcrum insert 28 preferably includes a conical surface 32 which mates with the inner conical surface of the stand 22 where these parts are cemented together. Additionally, a foam cushion 34 having an outer, conical surface is cemented within the conical stand 22 below the fulcrum insert 28. The needle bearing 30 is intended to support, removably, the compass arm 12, as described below.

The compass arm 12 includes a central, conical hub 36 and a pair of integral, aligned, radially extending arm portions 38, 40. The entire compass arm 12 preferably is molded in an integral, unitary piece. The upper portion of the conical hub 36 is formed in an inverted dimple 42 which meets with the conical portion of the hub 36 to define an annular shoulder 44 at the internal underside of the hub 36. A metallic bearing in the insert 46 is pressed snugly into the upper end of the conical hub 36. The bearing insert includes a downwardly opening dimple 48 which is intended to receive and rest on the upper needle point of the bearing 30, thus providing a low-friction support for the compass arm 12 to enable the compass arm to swing freely on the bearing 30. Additionally, the upper end of the conical stand 22, the inner surface of the conical hub 36 and the fulcrum insert 28 are dimensioned so that when the compass arm 12 is supported on the needle bearing 30, a substantial clearance will exist between the conical hub 36 and the conical stand 22. This clearance should be sufficient to enable either portion 38, 40 of the arm 12 to swing in a vertical plane, thus providing substantial freedom of movement for the compass arm. This aspect of the invention, not found in commercial compasses, is desirable in that it may be employed to demonstrate the fact that the arm 12 will become aligned in the same horizontal, north-seeking direction irrespective of the attitude of the arm 12 or the base 10 with a horizontal plane.

Each arm portion 38, 40 is molded to include an elongated socket 50, 52, being aligned with each other and along the center line of the compass arm 12. The sockets are spaced equidistant from the center of the compass arm. Each of the sockets 50, 52 is intended to receive an elongate ceramic bar magnet which is dropped simply into its associated socket. The bar magnets are oriented so that their poles are oriented in the same direction. The north-seeking pole of each magnet preferably is marked with indicia or other means to permit clear identification of that pole. In the preferred embodiment, the north-seeking pole of each magnet is colored red. When the magnets 54, 56 are placed in sockets 50, 52 in proper orientation with their red, north-seeking ends pointing in the same direction, the device will function as a true compass to demonstrate compass theory. The end of one of the arm portions as, for example, the portion 38 includes an integrally formed projection corresponding in shape to that associated with the north compass point formed on the margin 14 and of the base 10. If desired, both of these cones also may be colored red to be correlated with the red, north-seeking poles of the bar magnets, 54, 56.

A further feature of the conical projection 18 of the base 10 facilitates rotation of the base in relation to the base of the north-seeking compass arm 12. The user may hold the conical stand 22 between his fingers lightly to permit the stand 22 to be rotated while he turns the stand by gripping the conical projection 18 on the base 10.

Thus, the compass arm 12 may be supported on the base 10 to demonstrate compass theory. The compass arm 12 and base 10 may be separated to permit inspection of the low friction bearing by the student. Additionally, the bar magnets 54, 56 may be removed simply from the compass arm 12 to enable the student to experiment with various orientations for these magnets, thus demonstrating further the theory of the magnetic compass. The device may be used with either one of the magnets, in which case the compass arm 12 will be imbalanced and will be inclined to the horizontal. The compass still will function to indicate north, thus demonstrating that the compass will seek north irrespective of the attitude of the compass arm 12.

It should be understood that the foregoing description of the invention is intended merely to illustrative thereof and that other embodiments and modifications will be apparent to whose skilled in the art without departing from its spirit.

Having thus described the invention, what is claimed is:

1. A compass adapted particularly for demonstration of magnetic compass theory comprising:
    a base member including indicia corresponding to points of the compass, said base member including an upwardly projecting stand;
    low-friction bearing means mounted to the upper end of said stand for supporting a compass arm for pivotal movement about a vertical axis and for limited, but substantial pivotal movement about a horizontal axis; and
    a non-magnetic compass arm having bearing means at its mid-portion cooperative with said low friction bearing means and said stand for supporting said compass arm for said pivotal movement, said bearing means enabling said compass arm to be lifted off and separated from said stand,
    said compass arm including a pair of aligned, oppositely extending arm sections, at least one of said arm sections having an elongated socket formed therein, said socket being adapted to receive, removably, an elongate permanent bar magnet in longitudinal alignment with said compass arm.

2. A compass as defined in claim 1 further comprising:
    a projection formed on said base in proximity to the north point of said compass.

3. A compass as defined in claim 2 wherein said stand is of conical configuration to facilitate rotation of said base when said base is gripped lightly by the user.

4. A compass as defined in claim 2 and further comprising:
    a projection formed at the end of one of said compass arm sections, said second projection being of similar configuration to that of said projection on said base to correlate the north-seeking end of said compass arm with said north compass point.

5. A compass as defined in claim 1 wherein the upper end of said stand is of reduced dimensions to provide clearance between said compass arm and said stand to permit said limited rotation of said compass arm about said horizontal axis.

6. A compass as defined in claim 5 wherein said stand is of conical configuration having the apex thereof defined at its upper end, said compass arm including a central, conical hub adapted to be disposed over the upper end of said conical stand; and
    said bearing means being constructed to space said conical hub from said upper end of said conical stand to provide said necessary clearance therebetween.

7. A compass as defined in claim 6 wherein said bearing means comprises:
    a needle bearing secured to the upper end of said conical stand and extending upwardly therefrom;
    a bearing plate mounted to the center of said compass arm and having a downwardly opening dimple adapted to receive the upper needle end of said needle bearing.

8. A compass as defined in claim 1 wherein said bearing means comprises:
    a needle bearing secured to the upper end of said conical stand and extending upwardly therefrom; and
    a bearing plate mounted to the center of said compass arm and having a downwardly opening dimple adapted to receive the upper end of said needle bearing.

9. A compass as comprised in claim 1 and further comprising:
    a permanent bar magnet having a north-seeking end, said north-seeking end being marked to permit visual identification thereof.

10. A compass as defined in claim 1 wherein each of said arm sections has at least one of said sockets, said sockets being spaced equidistant from the center of said compass arm.

11. A compass as defined in claim 10 wherein said sockets are disposed in close proximity to the center of said arm.

12. A compass as defined in claim 10, and further comprising:
    a pair of permanent bar magnets, each of said magnets having a north-seeking end, and said north-seeking ends being marked identically to permit visual identification thereof, each of said permanent bar magnets being adapted to be received, removably, in either of said sockets.

* * * * *